No. 790,263. Patented May 16, 1905.

UNITED STATES PATENT OFFICE.

ERNST PREISWERK, OF BASEL, SWITZERLAND, ASSIGNOR TO THE FIRM OF SOCIETY OF CHEMICAL INDUSTRY IN BASLE, OF BASEL, SWITZERLAND.

PROCESS OF MAKING C-C-DIALKYLBARBITURIC ACIDS.

SPECIFICATION forming part of Letters Patent No. 790,263, dated May 16, 1905.

Application filed February 21, 1905. Serial No. 246,765.

*To all whom it may concern:*

Be it known that I, ERNST PREISWERK, chemist, a citizen of the Swiss Republic, and a resident of Basel, Switzerland, have invented a new and useful Process for the Manufacture of C-C-Dialkylbarbituric Acids, of which the following is a full, clear, and exact specification.

By this invention C-C-dialkylbarbituric acids are made by the action of alkyl esters of carbonic acid on C-C-dialkylmalonamids in presence of alcoholic sodium ethylate. For instance, with carbonic-acid ethyl ester the reaction takes place according to the following equation:

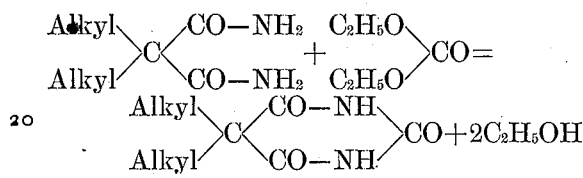

For instance, sodium may be dissolved in absolute alcohol and the product obtained added to a mixture of the ester of carbonic acid and C-C-dialkylmalonamid. The mixture may be stirred for some hours in a closed vessel at a suitable temperature. The reaction product may be suitably separated and purified.

As an example the most suitable proportions for making diethylbarbituric acid are as follows: Forty-six parts of sodium are dissolved in as little absolute alcohol as possible, and the solution of sodium ethylate obtained is added to a mixture of one hundred and thirty parts of carbonic-acid ethyl ester and one hundred and fifty-eight parts of finely-powdered C-C-diethylmalonamid, (E. Fischer, *Berichte der Deutschen Chemischen Gesellschaft*, Vol. 35, page 834.) The mixture is stirred for some hours in a closed vessel at 100° centigrade. After cooling the product which has separated is filtered off and again dissolved in water. The solution is separated from unattacked diethylmalonamid by filtration and the diethylbarbituric acid is precipitated from the filtrate by adding hydrochloric acid.

By recrystallization from hot water the C-C-diethylbarbituric acid is obtained in pretty flat needles, melting at 191° centigrade and difficultly soluble in cold water.

In analogous manner the other dialkylbarbituric acids may be obtained by substituting in the foregoing example for the diethylmalonamid the other alkyl derivatives of the malonamid.

What I claim is—

The described process for the manufacture of C-C-dialkylbarbituric acids by condensing the alkyl esters of carbonic acid with dialkylmalonamids by means of sodium ethylate.

In witness whereof I have hereunto signed my name, this 10th day of February, 1905, in the presence of two subscribing witnesses.

ERNST PREISWERK.

Witnesses:
 GEO. GIFFORD,
 AMAND BRAUN.